March 19, 1968 R. W. SOMMERS 3,374,224
NOVEL PREPARATION OF CARBOXYMETHYL CELLULOSE
Filed Dec. 28, 1964
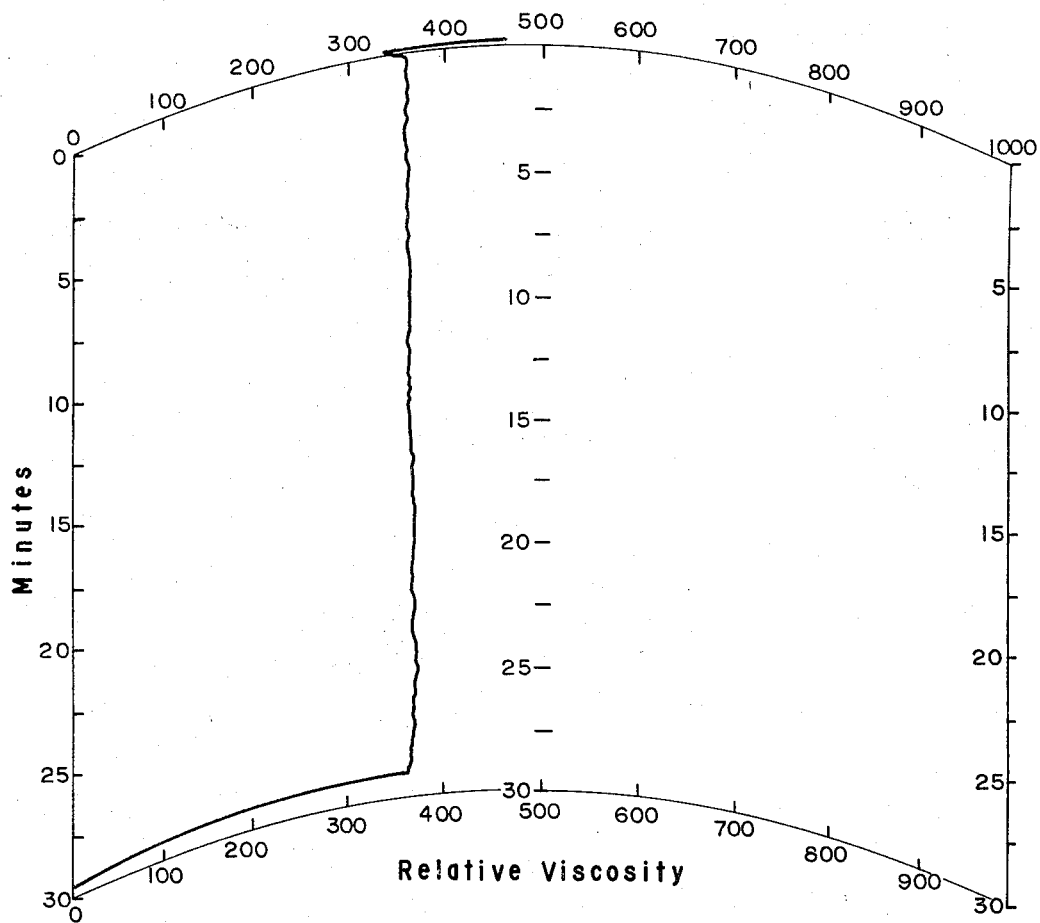
INVENTOR.
ROY W. SOMMERS
BY James J. Flynn 3,374,224
NOVEL PREPARATION OF CARBOXYMETHYL CELLULOSE
Roy W. Sommers, Pennsville, N.J., assignor to E. I. du Pont de Nemours and Company, Wilmington, Del., a corporation of Delaware
Filed Dec. 28, 1964, Ser. No. 421,340
7 Claims. (Cl. 260—231)

ABSTRACT OF THE DISCLOSURE

An alkali metal salt of carboxymethyl cellulose which forms clear aqueous solutions containing gell particles which are insoluble in 5% sodium hydroxide at room temperature but soluble above about 80° C., having a degree of etherification between about 0.4 to 1.3 and being characterized by an infrared adsorption band between 5.7 and 5.9 microns. The alkali metal salt is prepared by reacting alkali cellulose with an etherifying agent containing 2 to 20 mole percent dichloroacetic acid and the balance being monochloroaectic acid. The etherification reaction can be conducted in a slurry medium or by a dry mix procedure.

---

The present invention relates to alkali metal salts of novel carboxymethyl cellulose, especially sodium carboxymethyl cellulose, which form thixotropic aqueous solutions having unique properties and to the processes for their manufacture.

Alkali metal salts of carboxymethyl cellulose, hereinafter refered to as CMC, are manufactured by the reaction of alkali cellulose with alkali metal salts of chloroacetic acid, hereinafter referred to as MCA. This reaction is carried out in industry by diverse means. For example, U.S. Patent 2,510,355 describes a method for preparing CMC which comprises spraying cellulose with a caustic solution and then with the etherifying agent MCA as the solid cellulose is tumbled in a rotary drum. A continuous process for making CMC is described in U.S. Patent 2,553,725 wherein cellulose in sheet form is treated with caustic and MCA. Still another method for making CMC is described in U.S. Patent 2,517,577 wherein alkali cellulose is reacted with MCA in an alcohol slurry system and U.S. Patent 2,976,278 describes reacting alkali cellulose with MCA in a 3-component, 2-liquid phase system to prepare a cellulose ether. Another representative method for making smooth CMC in a slurry process is described in British Patent 928,792 (1960). Furthermore, cellulose has also been etherified with dichloroacetic acid alone. Such a process is described in U.S. Patent 3,017,237 and the resulting product is insoluble in water and also highly resistant to swelling by water. The above described methods have been used in commercially successful procedures for making cellulose ethers. However, there has been a need in the cellulose art for high viscosity water-soluble cellulose ethers that have superior suspending and stabilizing properties.

Accordingly, it is an object of this invention to provide a high viscosity water-soluble carboxymethyl cellulose. Another object of this invention is to provide a carboxymethyl cellulose that retains substantially the same viscosity after shearing said ether. Still another object of this invention is to provide high viscosity carboxymethyl cellulose that is particularly useful as thickening and suspending agents. A further object of this invention is to provide an economically and commercially feasible process for making high viscosity carboxymethyl cellulose. These and other objects of the invention will become apparent from the following detailed description.

It has now been found that cellulose can be treated with caustic, for example, sodium hydroxide, to produce alkali cellulose, and then reacted with an etherifying agent comprising from about 2 to 20 mole percent of dichloroacetic acid and the balance being monochloroacetic acid to produce carboxymethyl cellulose. The components of the etherifying agent, i.e., dichloroacetic acid and monochloroacetic acid can be added to the alkali cellulose simultaneously or separately. Preferably the components are added substantially simultaneously. If the dichloroacetic acid content is less than about 2% too little crosslinking occurs and if it is above about 20% too much crosslinking occurs. The resulting high viscosity salt of carboxymethyl cellulose is characterized by an infrared adsorption band between 5.7 and 5.9 microns and the gel particles in solution are insoluble in an aqueous 5% sodium hydroxide solution at room temperature but quite surprisingly, are soluble when heated above about 80° C. Furthermore, when the carboxymethyl cellulose is prepared by a slurry process to produce a smooth carboxymethyl cellulose salt, said salt is further characterized by retaining substantially a constant viscosity at constant rates of shear over a period of at least about 30 minutes in an aqueous solution.

The etherification reaction using the novel etherifying agent can be conducted in either a slurry medium, i.e., in the presence of inert diluents wheren smooth carboxymethyl cellulose is prepared, or by a dry procedure, i.e., without the addition of inert diluents. The manipulative details of processes that are representative of forming carboxymethyl cellulose by slurry methods and dry procedures which are, of course, applicable to the present invention are described, for example, in the aforementioned U.S. and British patents, and in copending application Ser. No. 363,016, filed Apr. 27, 1964, said patents and application are incorporated by reference in this application.

The unique water-soluble salts of CMC of the present invention, especially sodium CMC, are characterized by the following features:

In the dry state the CMC salts have substantially the same appearance as conventional CMC salts. They have a degree of etherification (D.E.) of about 0.4 to 1.3. The salt dissolves in water to give clear solutions having a grainy appearance (visible gel structure). The solution contains separate discrete gel particles which, however, do not settle out. The content of gel particles too large to pass a 325 mesh screen ranges from about 5 to 60% of the total sample. An infrared spectrum of the aforementioned gel particles shows an infrared adsorption band in the region from 5.7 to 5.9 microns, a region in which conventional sodium CMC does not absorb. The gel particles in the CMC solution are insoluble in dilute, i.e., 5%, aqueous NaOH at room temperature, i.e., about 20 to 30° C. but do substantially dissolve when heated, e.g., to about 80° C. or higher.

The foregoing properties apply to all of the CMC salts of the present invention. In addition, the preferred CMC salts, i.e., those made by slurry processes producing smooth CMC in the absence of dichloroacetic acid, have the very unusual property of maintaining a substantially constant viscosity at constant shear as long as extremely intensive shear is not applied. The solutions are made using the agitation sufficient to produce shearing as required by ASTM 1439–64–T and the relationship of viscosity with time is measured by a "Visco-Corder," Model VC–3.

Solutions of thixotropic materials normally decrease in viscosity with increasing time of shear. Solutions of the preferred products of the present invention, although visibly thixotropic, maintain a constant viscosity at a constant rate of shear for at least 30 minutes. FIGURE 1 illustrates this behavior for a 1.5% solution of one of the preferred products.

One measure of the degree of thixotropy applicable to high-viscosity materials, i.e., above about 500 centipoises in 1% solution, is the ratio of the viscosity in a 3% salt solution to viscosity in water (salt viscosity ratio, SVR). With high viscosity materials, this ratio is very sensitive to the degree of thixotropy. Thus a ratio of 0.9 or higher is obtained with smooth products whereas ratios as low as 0.01 or less are obtained with very thixotropic materials. With medium or low viscosity materials, i.e., those having measured values of viscosity lower than about 1000 centipoises in 2% solution, the measured values of the SVR do not correlate well with end use results or visual appearance and therefore, are not an appropriate measure of thixotropy for these materials.

The dependence of viscosity on shear rate is also a measurement of thixotropy. This can be defined by high shear slope (HSS). This follows the equation $u = aS^{-n}$ where $u$=viscosity in centipoises, S=the r.p.m. of the Brookfield viscometer, $n$=a constant which corresponds to the value of the slope on a log $u$ versus log S plot and $a$ is a constant. For a Newtonian fluid $n$ has a value of 0. for CMC solutions, $n$ increases in magnitude with the degree of thixotropy. The value of $n$ of thixotropic material can be greatly increased by subjecting the solution to high shear and allowing it to rest before the measurements are taken. The value of $n$ obtained in this manner will be referred to as the HSS. Smooth materials have an HSS below about 0.45 for high viscosity materials and 0.30 for medium or low viscosity products.

In order to prepare smooth CMC, reaction conditions which provide the following effects are selected:

(1) Penetration and swelling of inter- and ultracrystalline regions of the cellulose should be as uniform as possible during the steep period and the chloroacetic acid mixing period.

(2) Excessively high reaction rates should not prevail during etherification.

In order to attain these goals the following conditions are specified:

A. MULTI-COMPONENT, PARTIALLY WATER-MISCIBLE DILUENT SYSTEM (1) The composition of the total liquid should be from 30 to 46% alcohol with water-to-alcohol ratios of about 0.15 to 0.24. The alcohol is preferably ethanol and the liquid composition is preferably from 35 to 40% ethanol at a water-ethanol ratio of from 0.18 to 0.21.

(2) The temperature for steeping of the cellulose with alkali should be from 15° to 40° C. for 10 to 60 minutes but preferably from 28 to 33° C. for 30 to 45 minutes. The MCA and DCA-dichloroacetic acid should be added at a temperature from about 15° to 45° C. and preferably from 25° to 35° C. and mixed with the alkali cellulose for from about 5 to 30 minutes in this temperature range.

(3) The caustic to cellulose weight ratio should be from about 0.4 to 1.0 and preferably from 0.5 to 0.7 but never less than 2 moles of caustic per mole of etherifying agent used.

B. MULTI-COMPONENT, WATER-MISCIBLE-DILUENT SYSTEM (1) The cellulose is steeped in alkali from 1 to 3 hours at 0–30° C. in the presence of an inert organic diluent comprising by volume (a) from 70–96° of a water-miscible inert organic compound selected from aliphatic alcohols having from 2–4 carbon atoms, dioxane, tetrahydrofuran and acetone and 0 to 16% of a water-miscible compound different from (b) and consisting of methanol, ethanol or acetone and (c) 4 to 15% water.

(2) The mixture of MCA and DCA is added to the alkali cellulose at from about 0° C. to about 35° C. and the mass is slowly heated to etherification temperature.

Alternatively, the reaction can be carried out in a 3-component, 2-liquid phase reaction medium in which one liquid phase, i.e., the aqueous phase, comprises a mixture of water and a water-miscible aliphatic alcohol, preferably having from 2 to 4 carbon atoms. The second liquid phase, i.e., the organic phase, comprises an inert water-immiscible organic liquid hydrocarbon and an additional amount of said water-miscible aliphatic alcohol. The ratio of total liquid by weight in said reaction medium to dry cellulose is at least about 4:1 and does not exceed about 20:1, the ratio of water by weight in the water-alcohol phase to dry cellulose at the beginning of the reaction is in the range of about 0.03:1 to about 3.4:1. The total amount of said water-miscible aliphatic alcohol in the reaction medium constitutes at least about 7 percent by weight of the total water of the liquid in the reaction mixture at the start of the reaction.

The water-miscible liquid used in the etherification medium can be an inert hydrocarbon, for example, aliphatic hydrocarbons, aromatic hydrocarbons, and substituted aliphatic and aromatic hydrocarbons boiling above about 35° C. A representative list of substituted water-immiscible inert liquid hydrocarbons include, for example, hexane, heptane, octane, diisobutylene, benzene, toluene, xylene, cumene, chlorobenzene, bromobenzene, and chloroprene.

The organic water-miscible component of the liquid reaction medium is an aliphatic alcohol having from 2 to 4 carbon atoms and essentially ethanol.

While I do not wish to be bound by theory I believe that the infrared absorption band at 5.7 to 5.9 microns exhibited by the product of the present invention is due to a covalent carbonyl group. Such a group might be formed by the elimination of NaCl from the reaction of a sodium carboxymethyl group in one cellulose chain with a sodium α-chlorocarboxymethyl group (obtained by the reaction of dichloroacetic acid with cellulose) in another chain, thereby crosslinking the CMC by forming an ester structure.

The properties of the CMC made by this invention can be modified by suitable modifications to the process, which, however, do not change the basic process. For example, water can be added to the slurry after etherification is substantially complete to alter the physical form of the product and make it more dense as described in copending application Ser. No. 400,555, filed Sept. 30, 1964.

Purification and recovery of the produces of this invention are conventional and a satisfactory method is described in U.S. Patent 2,976,278.

In describing a cellulose ether and the processes used in preparing such ether, certain terms have been utilized by the art. Throughout this description, the terms have the following connotation.

Degree of etherification (D.E.): The actual degree of substitution obtained as determined by analysis of the product, i.e., the average number of ether groups which have been introduced per anhydroglucose unit of the cellulose molecule;

Theoretical degree of etherification (T.D.E.): The number of mols of etherifying agent, added to the reaction mixture, per anhydroglucose unit;

Reaction efficiency (R.E.): The ratio of the actual degree of etherification to the theoretical degree of etherification, expressed as percent.

Thus:

$$R.E. = \frac{D.E.}{T.D.E.} \times 100$$

D.P.=degree of polymerization,
MCA=monochloroacetic acid,
DCA=dichloroacetic acid, Steep=process of stirring cellulose with alkali in system before addition of etherifying agent.

When liquid compositions are identified by percentages the water includes that added with the cellulose, alcohol and caustic.

Excess caustic=the excess caustic calculated as follows:

$$\text{Excess caustic (percent)} = \frac{100B - 200A}{A}$$

where A is moles MCA used and B is moles caustic used, or similarly to calculate moles of caustic used from the percent excess caustic the formula is $$B = 2A + \frac{\text{Percent excess } XA}{100}$$

The invention is illustrated by the following examples which, however, are not intended to be limiting. Parts and percentages, where given, are by weight unless otherwise indicated.

Example 1

62.5 parts of 60 mesh purified wood pulp (4.2% moisture) are added to 278 parts of ethanol (92.4% by weight) and 368 parts of benzene in a mixer, and agitation commenced, 62.0 parts of aqueous caustic solution (56.3% NaOH) are added over a period of about one minute, and the mixture is steeped at a temperature of 30° C. for 30 minutes. 35.6 parts of a mixture of MCA and DCA containing 5 mole percent of DCA are then added at 35° C. and mixed for 10 minutes, and the reaction mixture is heated to 63° C. for a period of 70 minutes with constant agitation. The excess caustic is neutralized with glacial acetic acid.

The product is filtered, allowed to stand 3 minutes, and washed with aqueous ethanol and dried. Upon analysis, the product thus obtained has a D.E. of 0.70. Based on a T.D.E. of 1.0 the reaction efficiency of the process is 70%. The solubility of the product in water is excellent, forming a clear solution, a 1% solution having a viscosity of 1752 centipoises, containing discrete gel particles and giving a shear-time relationship as shown in FIGURE 1.

The SVR of the product is 0.61.

A sample of the product is dissolved in water to give a 0.1% solution. This solution is passed through a 325 mesh screen. The gel particles on the screen are washed thoroughly with water, dried and weighed. They amount to 42% of the total sample. An infrared spectrum of these gel particles pressed in a KBr pellet shows a strong absorption band at 5.75 microns. These gel particles before drying substantially dissolve in 6% NaOH when heated to 80° C. A sample of the product of Example 4 is treated identically. The gel fraction amounts to 10% of the total sample.

A similar run in which no DCA is used yields a product giving a viscosity in 1% aqueous solution of 1200 centipoises.

The procedure of Example 1 is used for the following examples:

| Examples | 2 | 3 | 4 | 5 | 6 |
|---|---|---|---|---|---|
| Liquid/cell. ratio | 11.25 | 11.25 | 11.25 | 11.25 | 11.25 |
| Type of cellulose | (1) | (1) | (2) | (2) | (1) |
| Slurry Medium: | | | | | |
| Percent C₆H₆ | 54.5 | 54.5 | 54.5 | 54.5 | 53 |
| Percent EtOH | 38.0 | 38.0 | 38.0 | 38.0 | 38 |
| Percent H₂O | 7.5 | 7.5 | 7.5 | 7.5 | 9 |
| TDE (based on MCA) | 0.975 | 0.943 | 0.943 | 0.90 | 0.943 |
| Mol. percent DCA in MCA/DCA mixture | 2.5 | 5.72 | 5.72 | 10.0 | 5.72 |
| NaOH/cell. ratio | 0.582 | 0.582 | 0.582 | 0.582 | 0.582 |
| Steep time, min | 30 | 30 | 30 | 30 | 30 |
| Steep temp., °C | 30 | 30 | 30 | 30 | 40 |
| Etherification mix time, min | 10 | 10 | 10 | 10 | 0 |
| Etherification mix temp., °C | 35 | 35 | 35 | 35 | 35 |
| Reaction time | 70 | 70 | 70 | 70 | 70 |
| Reaction temp | 63 | 63 | 63 | 63 | 63 |
| DE | 0.78 | 0.72 | 0.75 | 0.69 | 0.69 |
| 1% Viscosity | 1,480 | 2,536 | 2,972 | 2,648 | 2,700 |
| SVR | 1.05 | 0.59 | 0.58 | 0.12 | 0.02 |
| Density | | | | | |

¹ The cellulose used has a D.P. of 1600.
² The cellulose used has a D.P. of 1950.

The above products have properties similar to those shown for the product of Example 1.

Example 7

63.2 parts of 60 mesh purified wood pulp (5.0% moisture) are added to 602.5 parts of isopropanol and 62.5 parts of water in a mixer, and agitation commenced, 51.8 parts of aqueous caustic solution (72.3% NaOH) are added over a period of about one minute, and the mixture is steeped at a temperature of 20° C. for 2 hours. 40.2 parts of solid monochloroacetic acid and 2.4 parts of dichloroacetic acid are then added at 20° C., the temperature is raised to 70° C. over 30 minutes, and the reaction mixture is maintained at 70° C. for a period of 90 minutes with constant agitation. The excess caustic is neutralized with glacial acetic acid.

The product is filtered, allowed to stand 3 minutes, and washed with aqueous ethanol and dried. Upon analysis, the product thus obtained has a D.E. of 0.85. The solubility of the product in water is excellent, forming a clear solution containing discrete gel particles, a 1% solution having a viscosity of 924 centipoises. The SVR is 0.69.

Examples 8 and 9

The procedure of Example 1 is repeated with the following ingredient ratios.

| | |
|---|---|
| Liquid medium | 99.5% isopropyl alcohol–11.5% water. |
| Total T.D.E. | 1.0. |
| Mol percent dichloroacetic acid | 5. |
| NaOH/cellulose ratio | 0.582. |

The product has a D.E. of 0.66, a 1% viscosity of 2396 and a SVR of 0.11.

The above procedure is repeated increasing the total T.D.E. to 1.2 and the NaOH:cellulose ratio to 0.693. The product has a D.E. of 0.77, the 1% viscosity is 1920 cp. and the SVR is 0.28. The solutions appear thixotropic and have discrete gel particles.

Example 10

A dry-mix CMC is prepared in the apparatus ("Ko Kneader") described in U.S. Patent 2,505,125.

The alkali cellulose is prepared by mixing cotton linters (60 mesh D.P. 2200) with sodium hydroxide (NaOH:cellulose ratio 0.666), water (H₂O:cellulose ratio 0.7) and ethanol (ethanol:cellulose ratio 0.8) by passing it through the "Ko Kneader" and aging for 30 minutes at 45° C. The alkali cellulose formed, chloroacetic acid and dichloroacetic acid (total T.D.E. 1.2, mole percent DCA 5), water (H₂O:cellulose ratio 0.1) and ethanol (ethanol:cellulose ratio 1.0) is mixed by passing again through the "Ko Kneader" starting at 40° C. and aging 2 hours at 70° C.

The CMC formed has properties similar to that formed by a slurry process in that it contains in solution discrete gel particles insoluble in cold 5% NaOH.

The utility of the NaCMC made by the process of the present invention in suspending the pulp in orange juice is demonstrated as follows:

The samples of NaCMC identified as 1 and 2 were made by the process of the present invention. The sample identified as 3 is a sample of the highest viscosity grade of NaCMC available commercially. Item 4 contains no NaCMC and is a control. Each sample of orange juice is mixed in the same manner with concentrations of the NaCMC ranging from 0 to 0.15%. Each mixed sample is poured into a 100 ml. graduated cylinder and allowed to stand for 48 hours. The volume of suspended pulp is measured visually at 24 and 48 hours. A volume reading of 100 means that no settling occurred.

| No. | Conc. (percent) | Volume of suspended pulp at— | |
|---|---|---|---|
| | | 24 hours | 48 hours |
| 1 | 0.05 | 85 | 75 |
| | 0.10 | 91 | 85 |
| | 0.15 | 97 | 85 |
| 2 | 0.05 | 92 | 86 |
| | 0.10 | 100 | 93 |
| | 0.15 | 100 | 100 |
| 3 | 0.05 | 55 | 46 |
| | 0.10 | 71 | 59 |
| | 0.15 | 91 | 78 |
| 4 | 0.0 | 54 | 46 |

The effectiveness of the NaCMC of the present invention in preventing settling of barite in drilling mud formulations is demonstrated by making up several slurries of barite (12 pounds per gallon of slurry) containing 2 pounds per barrel of several NaCMC samples. Sample 1 is made by the process of the present invention and sample 2 is a high viscosity commercial product. These slurries are allowed to settle for 48 hours. The depth of the solid packed layer settled on the bottom is determined by a probe. The visual settling line is measured and the density of the slurry above the visual settling line (I), between the visual settling line and the hard packed solid (II), and the hard packed solid (III) is determined. These data are as follows:

| | CMC Sample | |
|---|---|---|
| | 1 | 2 |
| Visual settling line (percent of total depth) | 25 | 40 |
| Depth of hard packed solid on bottom (percent of total) | None | 15 |
| Density I (lb./gallon) | 8.5 | |
| Density II (lb./gallon) | 13.2 | 11.1 |
| Density III (lb./gallon) | | 22 |

I claim:
1. In a process for preparing an alkali metal salt of carboxymethyl cellulose, the improvement which comprises reacting alkali cellulose with an etherifying agent consisting essentially of from about 2 to 20 mole percent dichloroacetic acid, the balance monochloroacetic acid and recovering the resulting carboxymethyl cellulose.

2. In a process for preparing an alkali metal salt of carboxymethyl cellulose in a slurry medium, the improvement which comprises reacting alkali cellulose with an etherifying agent consisting essentially of from about 2 to 20 mole percent of dichloroacetic acid, the balance monochloroacetic acid and recovering the resulting carboxymethyl cellulose.

3. In a process for preparing an alkali metal salt of carboxymethyl cellulose wherein alkali cellulose is etherified in a 3-component, 2-phase liquid reaction medium in which one liquid phase is a mixture of water and a water-miscible aliphatic alcohol having from 2 to 4 carbon atoms, and the second liquid phase is a mixture of an inert water-immiscible liquid hydrocarbon and an additional amount of said water-miscible aliphatic alcohol, the ratio of total liquid by weight in said reaction medium to dry cellulose being at least about 4:1 but not exceeding about 20:1, the ratio of water by weight in the water-alcohol phase to dry cellulose at the beginning of the reaction being in the range of about 0.03:1 to about 3.4:1, the total amount of said water-miscible aliphatic alcohol in the reaction medium constituting at least about 7% by weight of the total weight of the liquid in the reaction mixture at the start of the reaction, and subsequently effecting etherification in said 3-component, 2-phase liquid reaction medium, the improvement which comprises reacting said alkali cellulose with an etherifying agent consisting essentially of from about 2 to 20 mole percent dichloroacetic acid, the balance monochloroacetic acid and recovering the resulting carboxymethyl cellulose.

4. In a process for preparing sodium carboxymethyl cellulose wherein alkali cellulose is etherified in a 3-component, 2-phase liquid reaction medium in which one liquid phase is a mixture of water and a water-miscible aliphatic alcohol having from 2 to 4 carbon atoms, and the second liquid phase is a mixture of an aromatic hydrocarbon and an additional amount of said water-miscible aliphatic alcohol wherein the alkali cellulose is formed by treating the cellulose with aqueous alkali in said 3-component system at a temperature from about 15 to 40° C. for at least 10 minutes, the alcohol content of said total liquid phases being from about 30 to 46% by weight, the weight ratio of water to alcohol being about from 0.15 to 0.24 during said etherification and the caustic-to-cellulose ratio before addition of the etherifying agent is from about 0.4 to 1.0 but never less than 2 moles of caustic per mole of etherifying agent used, adding said etherifying agent to said alkali cellulose at a temperature from about 15 to 45° C., maintaining this temperature while mixing for at least 5 minutes, then raising the temperature to about from 45° C. to 70° C. until substantially complete consumption of the etherifying agent has occurred, the improvement which comprises reacting said alkali cellulose with an etherifying agent consisting essentially of from about 2 to 20 mole percent dichloroacetic acid, the balance monochloroacetic acid and recovering the resulting carboxymethyl cellulose.

5. The process of claim 4 wherein the water-miscible alcohol is ethanol and the water-immiscible diluent is benzene.

6. A novel sodium salt of carboxymethyl cellulose which forms clear aqueous solutions containing gel particles, said gel particles being insoluble in 5% sodium hydroxide at room temperature but soluble above about 80° C., having a degree of etherification between about 0.4 to 1.3 and being characterized by an infrared absorption band between 5.7 and 5.9 microns.

7. The sodium salt of carboxymethyl cellulose of claim 6 being further characterized in aqueous solution by maintaining substantially constant viscosity at constant rates of shear over a period of at least 30 minutes.

No references cited.

DONALD E. CZAJA, *Primary Examiner.*

LEON J. BERCOVITZ, *Examiner.*

R. W. MULCAHY, *Assistant Examiner.*